United States Patent [19]

Weston

[11] 4,051,516
[45] Sept. 27, 1977

[54] DIGITAL PROCESSING OF PAL COLOR TELEVISION SIGNALS IN THE FORM OF A Y SIGNAL AND A COMPOSITE U+V/U−V SIGNAL

[75] Inventor: Martin Weston, Epsom, England

[73] Assignees: The Marconi Co. Ltd.; Standard Telephones and Cables Ltd., both of London, England

[21] Appl. No.: 643,800

[22] Filed: Dec. 23, 1975

[30] Foreign Application Priority Data
Dec. 30, 1974 United Kingdom .............. 56049/74

[51] Int. Cl.² .................. H04N 9/32; H04N 9/39
[52] U.S. Cl. ............................. 358/11; 358/13; 358/31
[58] Field of Search ............... 358/13, 16, 12, 14, 358/15, 31, 11

[56] References Cited
U.S. PATENT DOCUMENTS

| | | | |
|---|---|---|---|
| 3,267,211 | 8/1966 | Melchior | 358/14 |
| 3,858,240 | 12/1974 | Golding et al. | 358/13 |

OTHER PUBLICATIONS

Patchett, "Color Television . . . PAL System," pp. 154-157, Norman Price (Publishers) Ltd., London, 1968.

Primary Examiner—John C. Martin
Attorney, Agent, or Firm—Kemon & Estabrook

[57] ABSTRACT

PAL color television signals are processed in the form of a luminance signal Y and a composite chrominance signal consisting alternately of U + V on one line and U − V on the next. The composite chrominace signal is sampled at a frequency substantially equal to the PAL color subcarrier frequency and the luminance signal is sampled at the sub-Nyquist frequency of twice the color subcarrier frequency. Comb filters are included to remove undesired aliasing effects. The signals can be received in Y, U and V form or in encoded PAL form.

18 Claims, 11 Drawing Figures

FREQUENCY

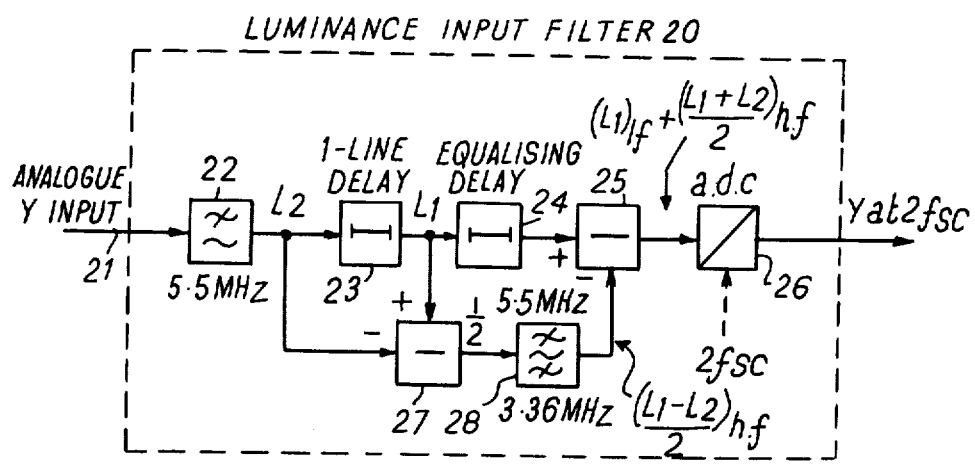
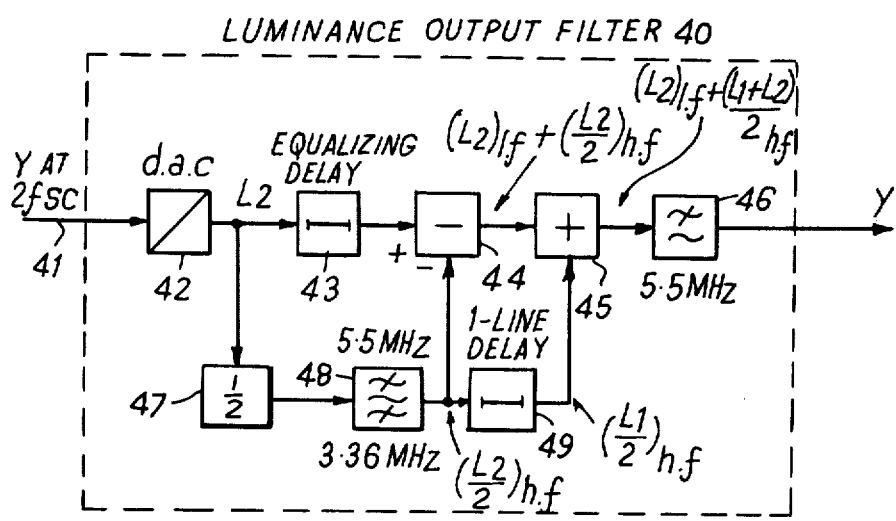

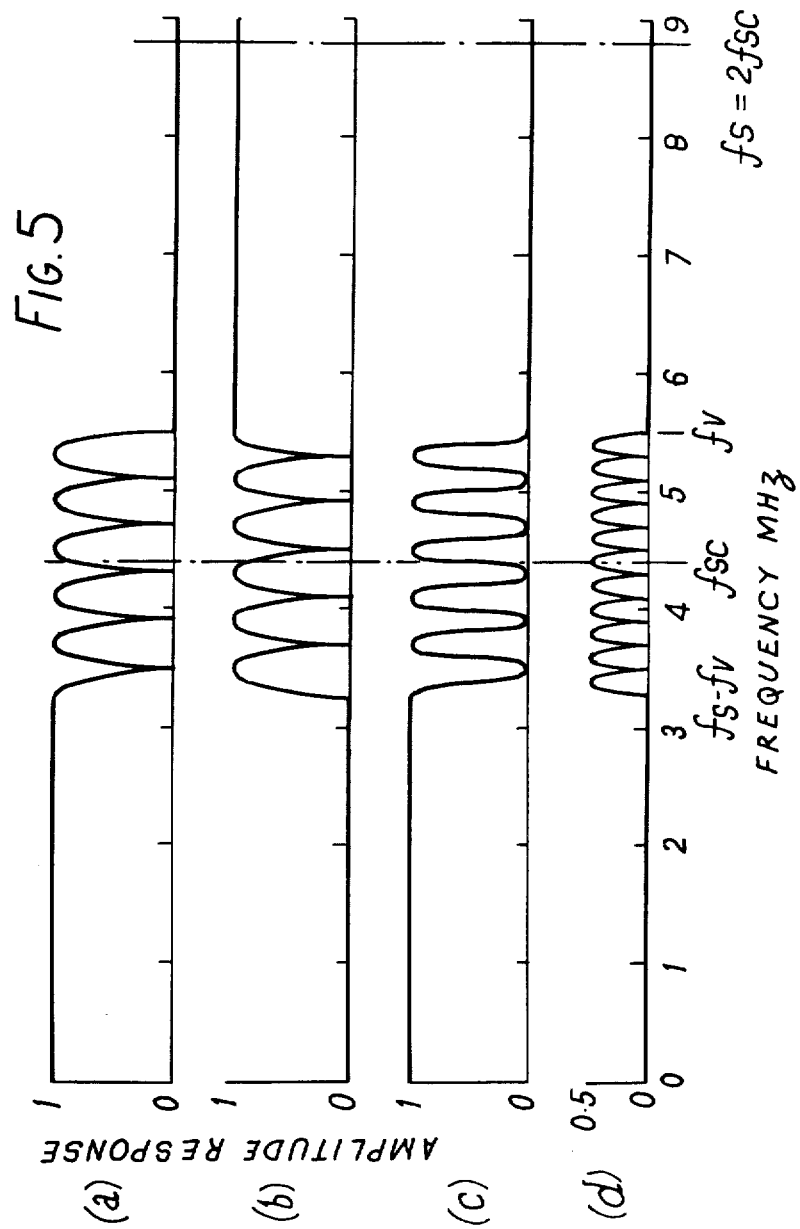

DIGITAL PROCESSING OF PAL COLOR TELEVISION SIGNALS IN THE FORM OF A Y SIGNAL AND A COMPOSITE U+V/U−V SIGNAL

This invention relates to the transmission and processing of colour television signals.

In the PAL colour television system two chroma signals U and V are quadrature modulated onto a subcarrier on the luminance signal Y. The V signal is inverted on alternate lines on the PAL signal.

Within a studio complex it is inconvenient to handle such signals in their fully-encoded form, as they may need to be decoded for mixing with other signals. They can be handled in the form of Y, U and V signals, but three separate signal paths are then required. Furthermore when handled in digital form a large total bit rate is required.

It is an object of this invention to reduce these problems.

Accordingly I propose handling the two chroma signals U and V alternately in the form of U+V and then U−V. Preferably U+V is transmitted on one line and U−V on the next. The Y signal can be transmitted separately.

Furthermore in a digital system I propose sampling the U+V/U−V composite signal at the colour subcarrier frequency fsc. The luminance signal if it is to be sampled at the same time can be sampled at 2 fsc.

Thus in a preferred embodiment of the invention employed with a digital PAL color television signal there are two signal paths, along one of which the signal Y is transmitted at a sampling rate 2 fsc, and along the other of which U + V is transmitted for one line and U − V for the next, the sampling rate in this case being fsc.

The invention also provides apparatus for converting directly between a fully encoded television signal on the one hand and the Y signal and composite U+V/U−V signal on the other.

The invention will now be described in more detail by way of example and with reference to the accompanying drawings, in which:

FIGS. 4A and 4B are more detailed circuit diagrams of the luminance input and output filters respectively;

FIG. 5 is a diagram illustrating the effect of the luminance comb filters;

In the following description the numerical values quoted are those appropriate to a 625/50 PAL colour television system, as is standard in the United Kingdom.

Figure 1:
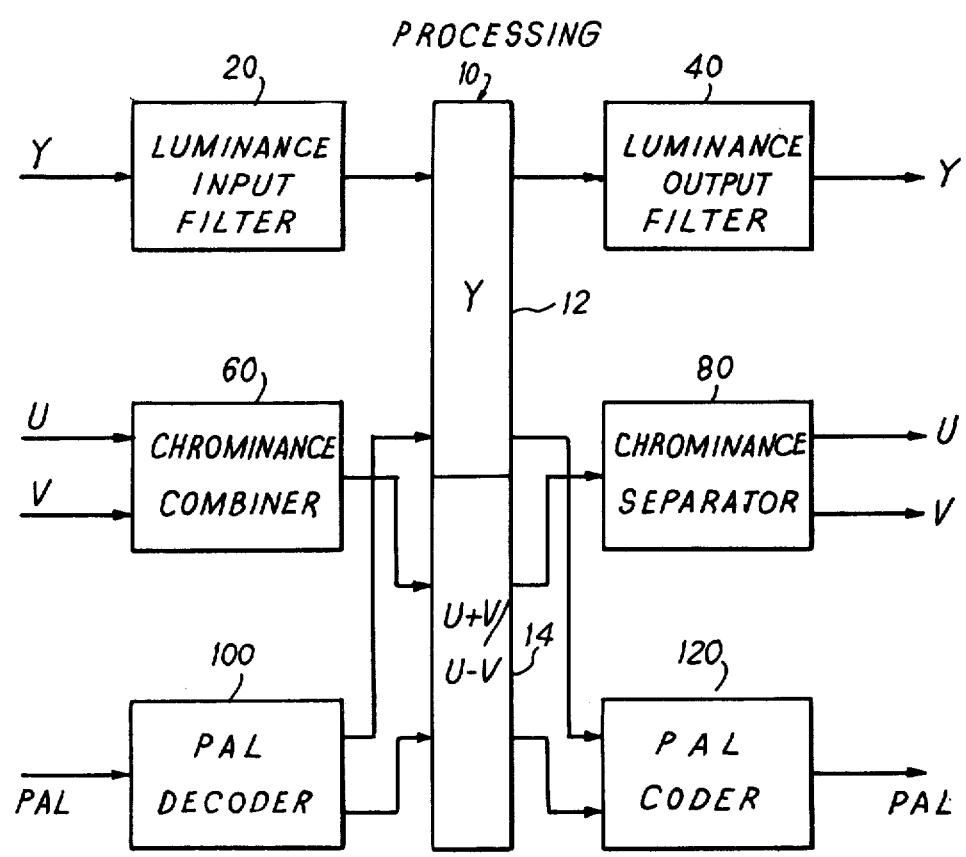
FIG. 1 illustrates in block form apparatus embodying the invention in a studio complex where the PAL colour television system is used.

FIG. 1 shows somewhat diagrammatically a studio complex in which processing circuitry represented by the block 10 includes switching devices for selectively applying a desired input to a desired output and mixing devices for mixing the signals at two or more inputs. Signals can be received or generated in either Y, U and V form or PAL encoded form. In either case, however, the processing is carried out with digital signals in the form of a Y signal and a composite U+V/U−V signal. The Y signal is processed in processing circuitry 12 and the composite chrominance signal U+V/U−V is processed in processing circuitry 14. These circuits are independent except that the same controlling operations are applied in parallel to the two circuits.

The received and generated Y signals are preferably filtered by a luminance input filter 20 and a luminance output filter 40 respectively. The U and V signals are combined into composite U+V/U−V form in a chrominance combiner 60 and the composite signal is separated into U and V signals in a chrominance separator 80. For direct use of PAL encoded signals a special PAL decoder 100 is used and an inverse PAL coder 120 is provided to generate PAL coded output signals.

It will be appreciated that the processing circuitry may be replaced by a simple transmission link for example.

These component circuits will now be described in more detail with reference to the remaining figures.

Figure 2A:
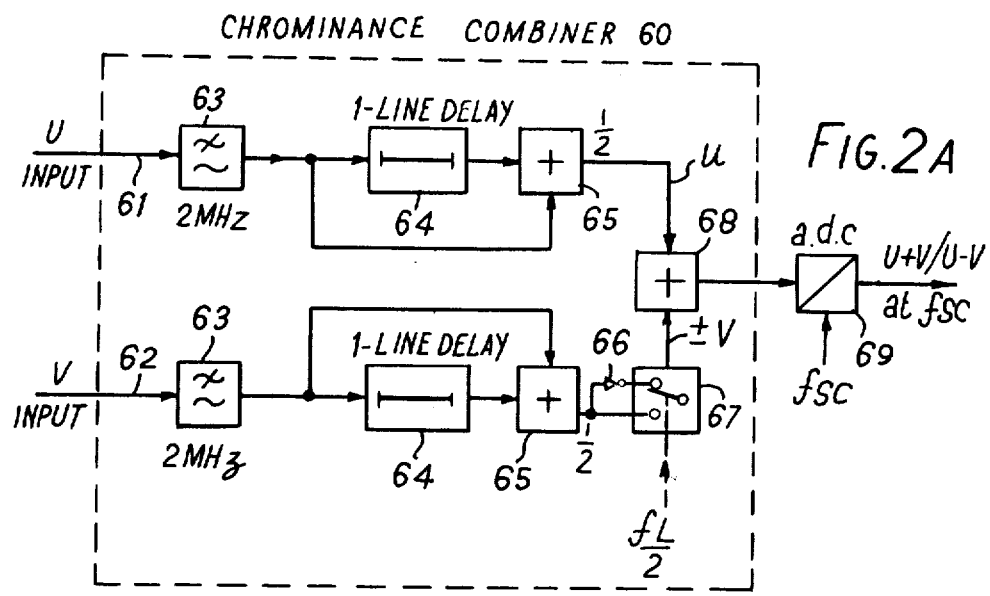
FIGS. 2A and 2B are more detailed circuit diagrams of the chrominance combiner and separator respectively.

The chrominance combiner 60 is shown in more detail in FIG. 2A. Two inputs 61 and 62 for the U and V signals respectively are each connected to a 2 MHz low-pass filter 63. Each signal is then passed both directly and through a one-line delay 64 to a half-adder 65. Each adder 65 thus provides a signal which is the average of the current line and the preceding line. The V signal is applied both directly and through an inverter 66 to a selector switch 67, which operates at half the line frequency and thus supplies the output of the associated half adder 65 on one line and its inverted output on the next. The output of the switch 67 and the output of the other half-adder 65 in the U-channel are applied to an adder 68. The output of adder 68 is sampled at the subcarrier frequency (4.4 MHz) in an analogue-to-digital converter 69.

Essentially therefore the received V signal is inverted by inverter 66 on alternate lines to provide +V on one line and −V on the next. This is then added in adder 68 to +U and the resultant digitised in converter 69 to provide an output U+V/U−V sampled at fsc.

The 2 MHz filters 63 (which may in practice be 2.2 MHz) provide ample horizontal resolution.

Figure 2B:
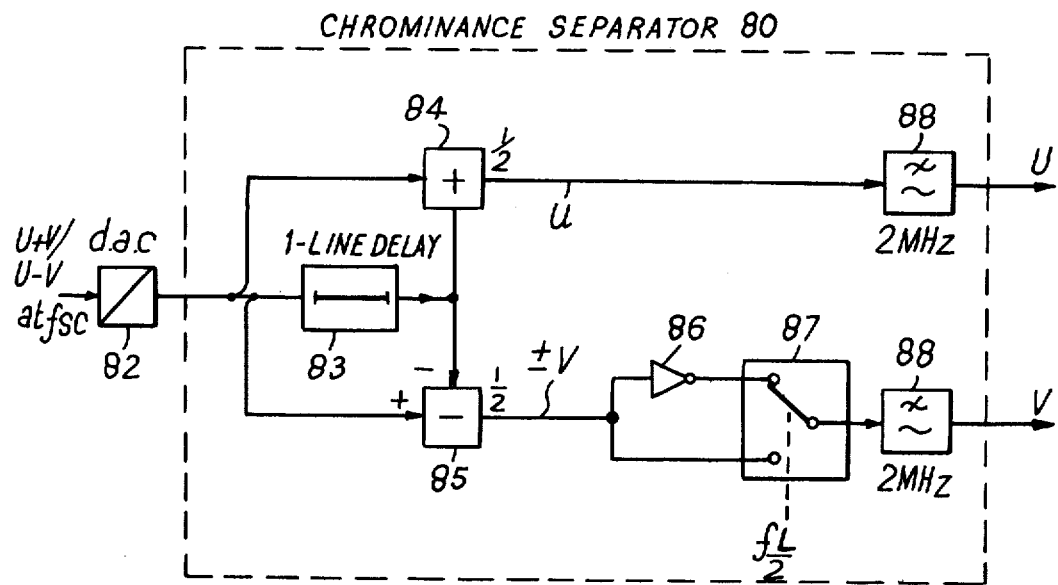

The composite U+V/U−V signal can be separated in the chrominance separtor 80 shown in FIG. 2B. The input is connected to a digital-to-analogue converter 82, the output of which is applied to a circuit not unlike a delay-line PAL decoder. A one-line delay 83, a half-adder 84 and a halving subtractor 85 are each connected to the output of the converter 82. The output of the delay line 83 is connected to the other input of adder 84 and to the inverting or negative input of subtractor 85. The output of subtractor 85 is connected both directly and through an inverter 86 to a selector switch 87 which operates at half the line frequency. The outputs of each of adder 84 and switch 87 are applied to a respective 2 MHz low-pass filter 88, which provides the U and V outputs respectively.

The delay line introduces an averaging between successive lines which reduces the vertical resolution of the chrominance signals, but this is generally not serious because the eye is not very sensitive to chrominance detail.

If the output of FIG. 2A is connected directly to FIG. 2B, the reason for the delays 64 and adders 65 becomes apparent. If they are omitted noticeable cross-talk can occur between the U and V signals. For example a sharp horizontal chrominance edge in the U channel alone will introduce a corresponding pulse in the V output. The polarity of the cross-talk pulse alternates on successive television frames. This gives rise to an objectionable chrominance flicker on sharp horizontal chrominance transitions.

Figure 3:
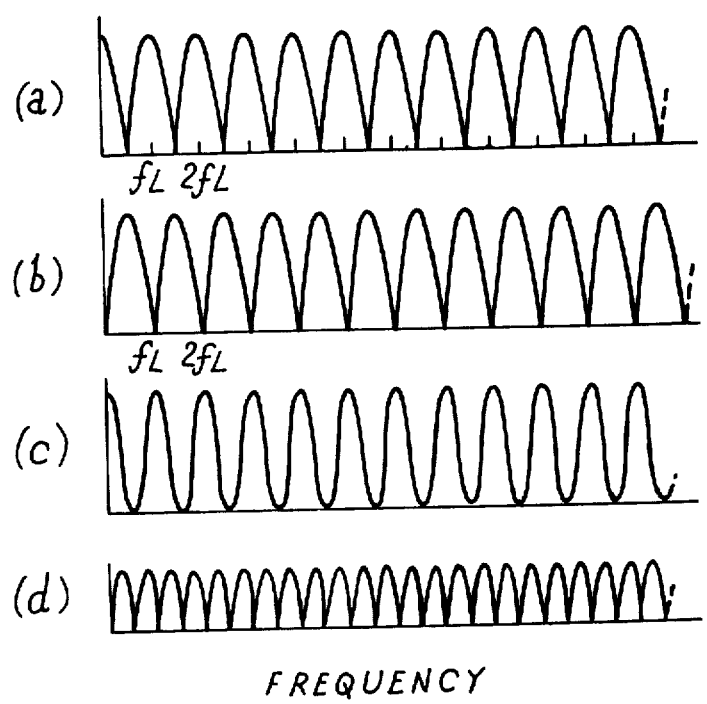
FIG. 3 is a diagram illustrating the effect of the chrominance comb filters.

This cross-talk is reduced by comb filtering the U and V signals before combination by averaging across the one-line delays 64. FIG. 3 shows the frequency response of these filters; waveforms (a) and (b) showing the response in the U and ±V signals respectively. The maxima in the U signal occur at $nf_L$ where $f_L$ is the line frequency, but the maxima in the ±V signal occur at $(n+\frac{1}{2})f_L$ because of the alternation of the V signal. The main V information is thus inserted in the nulls in the U spectrum.

The averaging across the delay line 83 in the separator 80 is equivalent to a second comb filter. This passes most of the U spectrum as shown at (c) in FIG. 3, but attenuates most of the V cross-talk on the U output as shown at (d) in FIG. 3. Similarly separation of the ±V signal by subtracting across the delay line 83 passes most of the ±V signal and attenuates most of the U components.

The overall effect is to reduce cross-talk pulses and to replace them by two pulses of opposite polarity. The poor chrominance response of the eye may tend to further integrate these pulses.

The U+V/U−V sampling system thus reduces vertical chrominance resolution but compared with a conventional U, V system reduces the required word rate. The signal line delay comb filters described allow a certain amount of cross-talk. More complex comb filters using more delays to give squarer teeth to the comb response could be used to reduce cross-talk still further if necessary.

Separation of the U and ±V could be reversed simply by adding the outputs of the adder 84 and subtractor 85 of FIG. 2B. This restores the U+V/U−V signal, and could be useful because although combined U+λ V/U−V has a lower word rate for transmission, separate U and ±V may be more convenient for monitoring.

The luminance input filter 20 and luminance output filter 40 are required because the luminance processing circuitry 12 operates at twice the subcarrier frequency which is below the Nyquist limit.

Referring to FIG. 4A, the luminance input filter 20 has an input 21 for receiving analogue luminance signals connected to a 5.5 MHz low-pass filter 22. To the output of the filter 22 there are connected in series a one-line delay 23, an equalising delay 24, a subtractor 25, and an analogue-to-digital converter 26 which operates at twice the colour subcarrier frequency. A halving subtractor 27 has its positive input to the input of the delay 23. The output of the subtractor 27 is applied through a 3.36 to 5.5 MHz band-pass filter 28 to the negative input of subtractor 25.

As the sampling frequency (8.86 MHz) is less than twice the highest inut frequency (5.5 MHz), components will occur in the range 3.36 MHz (= 8.86 − 5.5 MHz) and 5.5 MHz which may regarded as resulting from beating between the signal frequencies and the sampling frequency. These components, which are due to spectrum folding which takes place upon sampling, as is described for example in U.S. Pat. No. 3,858,240, I term alias components. To reduce these alias components the circuits provide a degree of comb filtering of the input signal. The comb filtering is achieved by averaging the input and output of the delay 23 over the frequency range 3.36 to 5.5 MHz, so as to remove odd harmonics of half the line frequency. Desired signal components will tend to be strongest at integral harmonics of the line frequency. Since, in the PAL system, the subcarrier frequency is approximately an odd multiple of one-quarter of the line frequency, the sampling frequency is approximately an odd multiple of half the line frequency. Thus the alias components will tend to congregate about odd harmonics of half the line frequency.

Considering first the higher part of the input signal frequency range, that is between 3.36 and 5.5 MHz, the output and input of the delay 23 are substracted so that if a line $L_1$ is appearing at the output of the delay 23 the next line $L_2$ is entering it and the subtractor 27 generates $(L_1 - L_2)/2$. This is filtered in the filter 28, and is subtracted from $L_1$ in the subtractor 25 to produce $L_1 - (L_1 - L_2)/2 = (L_1 + L_2)/2$. The delay 24 is included to compensate for the slight delay introduced in the filter 28.

The lower part of the frequency band below 3.36 MHz is not passed by filter 28 and thus straight from the delay 23 to the converter 26.

The frequency response is thus as shown in FIG. 5. The output of subtractor 25 is shown at (a), from which it is seen that below 3.36 MHz there is essentially no filtering, while between 3.36 MHz and 5.5 MHz comb filtering is provided which removes odd harmonics of half the line frequency. The pitch of the comb filter teeth has been greatly exaggerated for clarity. The alias components introduced by the 2 $f_{sc}$ sampling are shown at (b), and are seen to fall mainly in the gaps created by the input filtering. Most of these alias components are removed by the luminance output filter 40 which will now be described.

The comb filter of FIG. 4A is similar to that of U.S. Patent application Ser. No. 575,798 filed May 8, 1975, now abandoned, published as German Laid-Open application Offenlegungsschrift) 25 21 288, to prefilter PAL before sampling at 2 $f_{sc}$. A rearrangement of the filter is used in FIG. 4B.

Referring to FIG. 4B, the luminance output filter 40 has an input 41 for receiving a luminance signal sampled at twice colour subcarrier frequency. To the input there are connected in series a digital-to-analogue converter 42, an equalising delay 43, a subtractor 44, an adder 45 and a 5.5 MHz low-pass filter 46. A divide-by-two circuit 47 and a 3.36 to 5.5 MHz band-pass filter 48 are connected in series to the output of the converter 42. The output of the filter 48 is applied directly to the negative input of subtractor 44 and through a one-line delay 49 to the other input of adder 45.

As with the input filter, frequencies below 3.36 MHz pass directly from converter 42, via delay 43, subtractor 44 and adder 45 to filter 46 without modification. High frequencies between 3.36 and 5.5 MHz are however passed by filter 48. Considering a line $L_2$ at the output of converter 42, subtractor 44 will thus provide in this frequency band $L_2 - L_2/2 = L_2/2$. In adder 45 this is added to the output of delay 49, namely $L_1/2$, to give $(L_1 + L_2)/2$. Thus odd harmonics of half the line frequency again will be filtered out.

Referring again to FIG. 5 the effect of the output filter can be seen. At (c) is shown the frequency response of the desired luminance signal after filtering by the output filter. The residual alias components passed by the output filter are shown at (d).

The input and output filters are not identical, the first delays low frequency signals whereas the second does not. This ensures that low frequencies undergo the same overall delay as the high frequencies. The converse arrangement could of course be used.

Taken together, the luminance input and output filters sacrifice high frequency luminance diagonal information in order to reduce the sampling rate to below the Nyquist limit. More complex comb filters can be used to give squarer teeth to the filter response to reduce the alias components still further. The comb filters can be instrumented digitally, and digital line delays can then be used overcoming the noise and drift problems of analogue delays. Many of the components in the input and output filters are similar and it is thus possible to build a unit which can be mode switched to act as either an input filter or an output filter.

Taken together the luminance input filter 20 and chrominance combiner 60 provide a means for processing or transmitting a colour television signal in uncoded form with a total bandwidth of only 3 $fsc$.

Figure 6A:
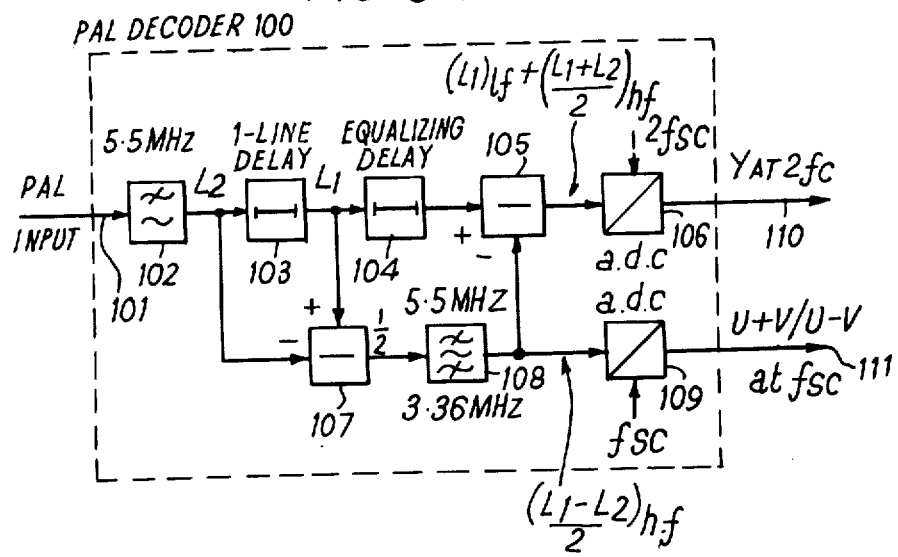
FIGS. 6A and 6B are more detailed circuit diagrams of the PAL decoder and coder respectively.

PAL encoded signals could be decoded in a conventional decoder and the resultant Y, U and V signals applied to the inputs of the luminance input filter and the chrominance combiner. However, FIG. 6A shows a PAL decoder 100 which directly produces a luminance signal Y, and a composite chrominance signal $U+\lambda V/U-V$. The circuit is similar in many respects to the luminance input filter 20, and includes an input 101, a 5.5 MHz low-pass filter 102, a one-line delay 103, an equalising delay 104, a subtractor 105, an analogue-to-digital converter 106, a second subtractor 107, and a 3.36 to 5.5 MHz band-pass filter 108, all of which are similar to the corresponding components of FIG. 4A. In addition there is a second analogue-to-digital converter 109 connected to the output of the band-pass filter 108 which operates at a sampling rate equal to the colour subcarrier rate $fsc$.

The luminance component of an incoming PAL signal is treated in exactly the same way as in the luminance input filter 20. Odd harmonics of half the line frequency are removed from the 3.36 to 5.5 MHz band enabling the luminance component to be sampled at 2 $fsc$ without serious aliasing. Most of the chrominance information is centred on odd harmonics of one quarter of the line frequency and are not removed by the luminance comb filter but are merely attenuated by 3 dB.

Figure 7:
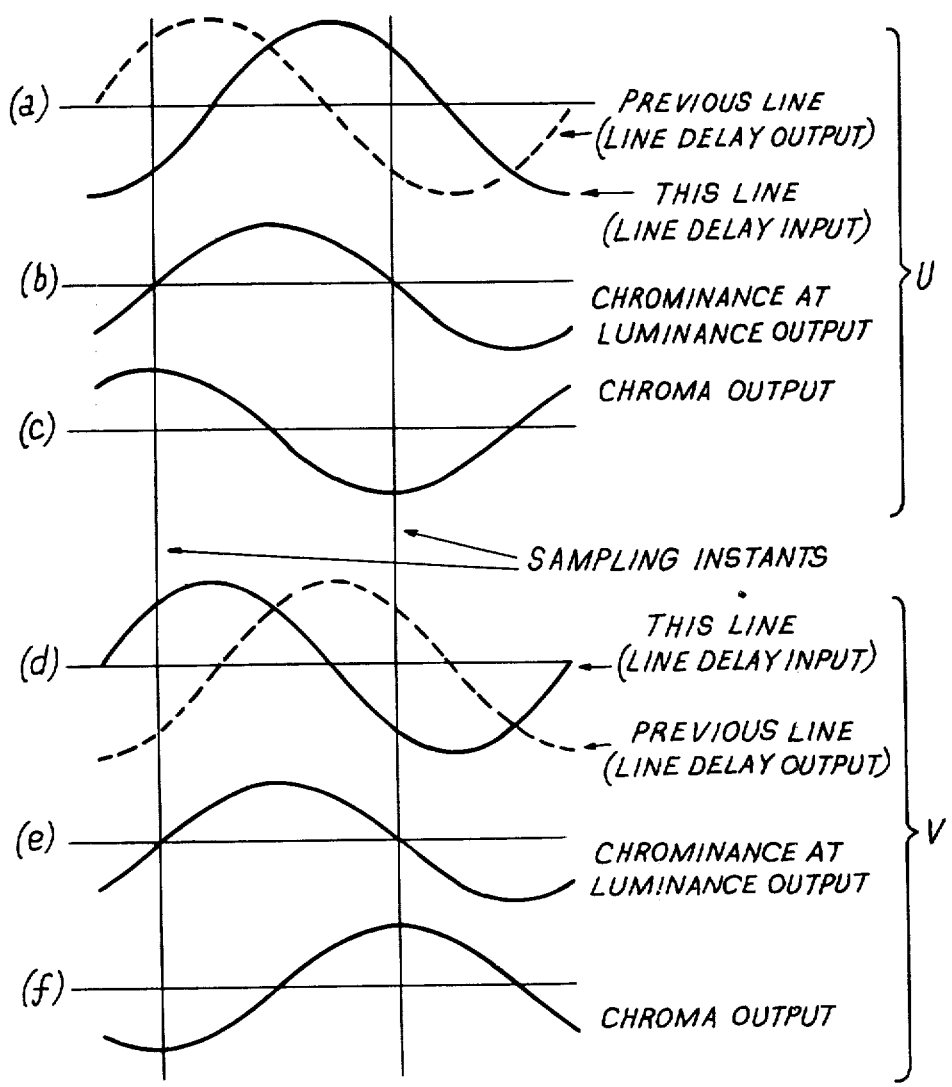
FIG. 7 illustrates some waveforms occurring in the PAL decoder.

The chrominance components remaining on the luminance output are, however, ignored by sampling at 2 $fsc$ at the instants when the chroma waveform is passing through zero. This is possible because the comb filter brings the quadrature-modulated U and V components into phase with each other. FIG. 7 illustrates how this happens.

Referring to FIG. 7, in the chroma band the filter averages two successive lines. Since the U component on the previous line leads the U component on the present line by 90° the filter attenuates U components by 3 dB and produces a 45° phase-advance as shown at (a) and (b) in FIG. 7. On the other hand, V on the previous line lags by 90°, so the filter phase-lags V components by 45° as shown at (d) and (e).

Thus at the luminance output of the decoder before the a.d.c. 106, the chroma wave-forms are in phase and may be ignored by sampling at the zeros, as shown. This is only true if the chrominance remains the same on successive lines. Where the chrominance is changing from line to line some breakthrough into the luminance will occur. This will only produce subcarrier dots on chrominance edges and should not be too serious. A similar effect occurs in normal PAL decoding.

The signal at the chroma output before the a.d.c. 109 is the difference between successive lines. Waveforms (c) and (f) of FIG. 7 shows that this also brings the two quadrature components into phase with each other. Actually every other line is in anti-phase. Also the chroma output is 90° out of phase with the chroma on the luminance output. Sampling the chroma at the same instants as the luminance thus samples both U and V at the peaks.

Sampling the chroma at 2 $fsc$ would give the outputs:

| U+V    |       | −(U+V) |        | U+V    |       | −(U+V) |        | U+V    | on line n   |
|--------|-------|--------|--------|--------|-------|--------|--------|--------|-------------|
|        | U−V   |        | −(U−V) |        | U−V   |        | −(U−V) |        | on line n+1 |
| −(U+V) |       | U+V    |        | −(U+V) |       | U+V    |        | −(U+V) | on line n+2 |
|        | −(U−V)|        | U−V    |        | −(U−V)|        | U−V    |        | etc.        |

Since the chroma output has been band-pass filtered the chroma may be demodulated by sampling at fsc to give the samples:

| U+V |     | U+V |     | U+V |     | on line n   |
|-----|-----|-----|-----|-----|-----|-------------|
|     | U−V |     | U−V |     | U−V | on line n+1 |
|     |     |     |     |     |     | on line n+2 |
|     |     |     |     |     |     | etc.        |

The decoder thus produces combined chrominance (U+V/U−V) similar to that produced by the chrominance combiner of FIG. 2A. The comb filter prefilters the quadrature modulated U and V before combining; thus reducing cross-talk effects.

Figure 6B:
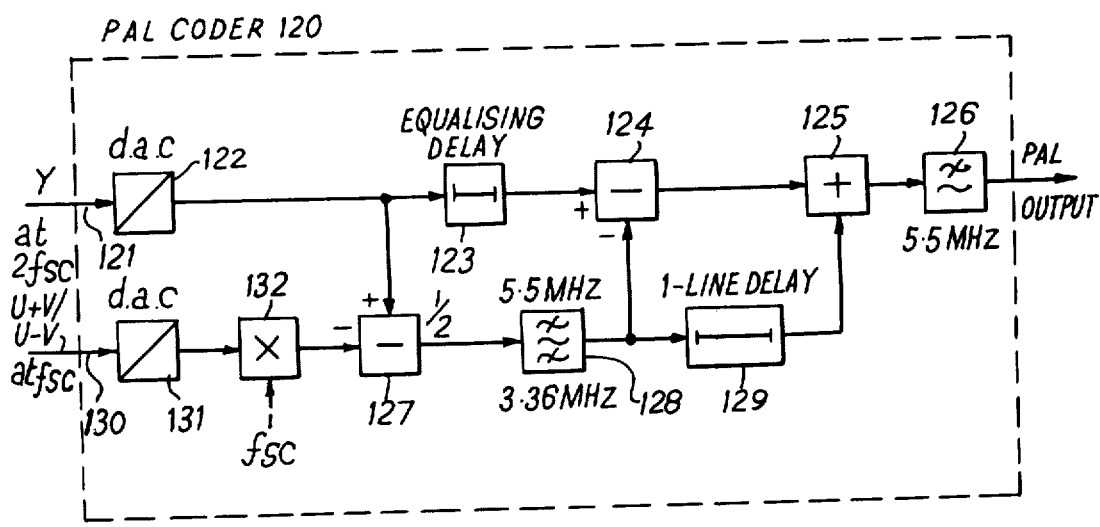

The comb filters of FIGS. 6A and 6B are also themselves based on that of the aforementioned Patent Application (to prefilter PAL before sampling at 2 $fsc$). An extra chrominance output is, however, added and the sampling phase is shifted by 90° to obtain a 2 $fsc$ sampled luminance signal free of chrominance rather than a 2 $fsc$ sampled PAL signal containing the chrominance. The chrominance (U+V/U−V) is obtained instead at the extra output.

As in all PAL decoders some high frequency luminance components will find their way to the chroma output and be interpreted as chrominance. In this decoder the comb filter prevents luminance components at harmonics of line frequency reaching the chroma output. These components are the most likely to occur but do not give rise to the most objectionable cross-colour patterns. The most visible patterns are produced by luminance components at odd harmonics of quarter line frequency, these are demodulated as coarse patterns. The comb filter attenuates these components by the same amount (3 dB) as the true chrominance components.

Thus the overall visibility of cross colour is the same as for conventional decoders although some pictures, e.g. test card resolution bars, may be improved. Odd harmonics of half line are enhanced by 3 dB but these components are unlikely to occur and do not give very visible patterns.

The PAL decoder of FIG. 6A employs an analogue comb filter and produces two analogue outputs which must be sampled in separate a.d.c.'s. It is, however, possible to perform the comb filtering and 2 fsc sampling digitally. This requires only one a.d.c. preferably clocked at 4 fsc. The phase of the sampling is important. For correct decoding the sampling instants must occur at 45°, 135°, 225° and 315° relative to 'U' subcarrier reference phase. The correct sampling phases can be ensured by examining the digitised colour burst and feeding back a control signal to the clock oscillator.

The output of any digital transmission system will have to be turned into PAL for transmission to the viewer. Digital Y, U+V/U−V could be converted to analogue Y, U, V and then coded in a conventional PAL coder. FIG. 6B, however, shows a comb filter which does the complete operation. It takes luminance sampled at 2 fsc and combined chrominance sampled at fsc and produces a PAL coded signal.

The PAL coder 120 of FIG. 6B includes an input 121, a digital-to-analogue converter 122, an equalizing delay 123, a subtractor 124, an adder 125, and a 5.5 MHz low-pass filter 126, connected in series and all of which are similar to the corresponding components of FIG. 4B. A halving subtractor 127 replaces the divide-by-two circuit of FIG. 4B, and has its output connected through a 3.36 to 5.5 MHz band-pass filter 128 to a one-line delay 129. A second input 130 receives the composite U+V/U−V signal which is applied to a digital-to-analogue converter 131. The output of the converter is modulated onto the colour subcarrier in a modulator 132, the output of which is in turn applied to the subtractive input of the subtractor 127.

The comb filter in FIG. 6B removes from the luminance signal alias components at odd harmonics of half line frequency. It thus acts as the output comb filter of FIG. 4B required by the sub-Nyquist (2 fsc) luminance sampling system.

The combined chrominance U+V/U−V is modulated onto subcarrier. The comb filter then separates U and V onto quadrature carriers. It does this by subtracting the input from the output of the line delay 129. This advances the U component by 45° and delays the ±V component by 45°. The explanation of this is similar to that given above for decoding.

The two transcoders described above with reference to FIGS. 6A and 6B have the important property that, assuming the band-pass filters used are perfect, PAL signals can be decoded to digital Y, U+V/U−V and then recoded to PAL without any fundamental loss, since most of the impairments introduced by decoding PAL to digital Y, U+V/U−V are cancelled by recoding to PAL.

Many of the components of the PAL decoder and encoder are similar and it is thus possible to build a unit which can be mode switched to act as either a decoder or an encoder.

Although both the decoder 100 and coder 120 contain filters which reduce the diagonal luminance resolution and vertical chrominance resolution, no information is lost. All information not contained in the luminance signal is contained in the chrominance signal and vice versa. The coder recombines the signals to regenerate the original PAL signal, merely delayed by one line. Decoding and recoding can thus, in principle, be performed many times without the impairments building up to objectionable levels.

This is only strictly true if the comb filters use perfect bandpass filters with an infinite rate of cut. The response of such a filter is unity in-band and zero out-of-band. In practice there will be a region on the band edge where the response is neither unity or zero. At these frequencies the signals will not recombine perfectly.

In general the coder output =

$$(1 - k(w) + k(w)^2)L_2 + (k(w)^2)\left(\frac{L_1 + L_3}{2}\right)$$

where $k(w)$ is the response of the band-pass filter at frequency $w$. This is equal to $L_2$, i.e. no comb filtering occurs, when $k = 0$ or 1. If $k$ lies between 0 and 1, as at the band edge, some comb filtering will occur and residual alias and chrominance cross-talk will also occur at these frequencies.

Complex transversal band-pass filters can be made with a steep rate of cut, which reduce the region over which comb filtering occurs.

It will be seen that a PAL decoder can be constituted from the various circuits described by connecting the circuits 40 and 80 of FIGS. 4B and 2B respectively to the two outputs of the decoder circuit 100 of FIG. 6A. This may prove useful in certain circumstances.

In a digital implementation of the system, the analogue-to-digital converters will be placed at the inputs rather than the outputs of the circuits 20, 60 and 100, and the digital-to-analogue converters at the outputs rather than the inputs of the circuits 40, 80 and 120. Digital filters can then be used.

What I claim is:

1. Apparatus for generating digital PAL chrominance signals, the apparatus including input means for receiving television signals comprising chroma signals U and V of PAL type, combining means coupled to the input means and operative to form the sum U + V of the signals U and V on one television line and their difference U − V on the next, and digitising means for digitising the signals with a sampling frequency substantially equal to the PAL colour subcarrier frequency.

2. Apparatus according to claim 1, including comb filter means for averaging the content of each two succesive lines.

3. Apparatus according to claim 2, wherein the comb filter means includes a one-line delay and means for linearly combining the input and output of the delay.

4. Apparatus according to claim 1, wherein the input means is adapted to receive television signals comprising a luminance signal Y, and the digitising means is adapted to digitise the luminance signal with a sampling frequency substantially equal to twice the PAL colour subcarrier frequency.

5. Apparatus according to claim 1, wherein the input means comprises two input terminals for receiving respectively U and V television signals, and including means for inverting the polarity of the V signal on alternate lines.

6. Apparatus according to claim 5, including two comb filters for averaging the content of each of two successive lines of the U and V signals respectively.

7. Apparatus according to claim 6, wherein each comb filter comprises a one line delay and a half-adder connected to the input and output of the delay.

8. Apparatus according to claim 1, wherein the input means comprises an input terminal for receiving an encoded PAL television signal.

9. Apparatus according to claim 8, including a one line delay connected to the input terminal, and means for linearly combining the input and output of the delay.

10. Apparatus according to claim 9, including a filter connected to the output of the linearly combining means for stopping frequencies below a frequency substantially equal to twice the PAL colour subcarrier frequency less the highest frequency of the PAL signal, the output of this filter being sampled at the PAL colour subcarrier frequency.

11. Apparatus according to claim 10, wherein the output of the filter is also subtracted from the output of the delay and the resultant sampled at twice the colour subcarrier frequency at predetermined positions where the chrominance signal passes through zero, to provide a digital luminance signal.

12. A method of digitising PAL chrominance signals, including the steps of receiving analogue television signals comprising chroma signals U and V of PAL type, forming the sum U + V of the signals U and V on one television line and their difference U − V on the next, and digitising the signals with a sampling frequency substantially equal to the PAL colour subcarrier frequency.

13. A method of generating an encoded PAL television signal from a luminance signal Y and a composite chrominance signal U + V / U − V generated by the method of claim 12, comprising modulating the composite chrominance signal onto a PAL colour subcarrier, linearly combining the modulated signal with the Y signal, stopping frequencies in the combined signal which are below a frequency substantially equal to twice the PAL subcarrier frequency less the highest frequency of the PAL signal, comb filtering the resultant signal through a comb filter which averages the content of each two successive lines, and adding the filtered signal to the luminance signal to provide an encoded PAL signal.

14. Apparatus for generating an encoded PAL colour television signal from a luminance signal Y and a composite signal U + V / U − V, comprising a modulator for modulating the composite chrominance signal onto a PAL colour subcarrier, means for linearly combining the modulated signal with the luminance signal, a filter for stopping frequencies in the combined signal which are below a frequency substantially equal to twice the PAL colour subcarrier frequency less the highest frequency of the PAL signal, a comb filter connected to receive the resultant signal for averaging the content of each two successive lines, and an adder for adding the comb filtered signal to the luminance signal to provide at an output an encoded PAL signal.

15. A chrominance combiner circuit for PAL signals comprising:
U and V signal inputs;
a one-line delay coupled to each input;
a half-adder having inputs coupled across each delay;
an inverter selectively coupled to the output of the V-signal half-adder to invert alternate lines;
an adder coupled to the outputs of the U-signal half-adder and the inverter; and
a sampling circuit coupled to the output of the adder to sample the signal applied thereto at the PAL colour subcarrier frequency, whereby a sampled signal is produced consisting of U + V on one line and U − V on the alternate lines.

16. A PAL encoder comprising:
a Y signal input;
a chrominance signal input for receiving a composite chrominance signal comprising U + V on one line and U − V on alternate lines;
a halving subtractor having its non-inverting input coupled to the Y signal input and its inverting input coupled to the chrominance signal input;
a band-pass filter coupled to the output of the halving subtractor for passing frequencies in the chrominance modulation signal frequency range;
a subtractor having its non-inverting input coupled to the Y signal input and its inverting input coupled to the output of the band-pass filter;
a one-line delay coupled to the output of the bandpass filter; and
an adder coupled to the outputs of the subtractor and the one-line delay.

17. In a television studio system, processing means comprising:
first processing circuitry adapted to operate upon a luminance signal Y; and
second processing circuitry adapted to operate upon a composite chrominance signal comprising U + V and U − V on alternate lines, the second processing circuitry being coupled to the first processing circuitry for control in parallel therewith.

18. A method of decoding a PAL colour television signal comprising the steps of:
delaying the input signal by one line period to provide a delayed signal;
subtracting and halving the delayed and input signals to provide a first difference signal;
filtering the first difference signal to pass frequencies in the chrominance modulation frequency range to provide a filtered signal;
substracting the delayed and filtered signals to provide a second difference signal;
sampling the second difference signal at a frequency twice the PAL colour subcarrier frequency to provide a luminance output signal; and
sampling the filtered signal at the PAL colour subcarrier frequency to provide a chrominance output signal.

* * * * *